May 13, 1941. P. A. E. ARMSTRONG 2,241,572
WORKING METALS BY THE ELECTRIC ARC
Filed Nov. 7, 1940 4 Sheets-Sheet 1
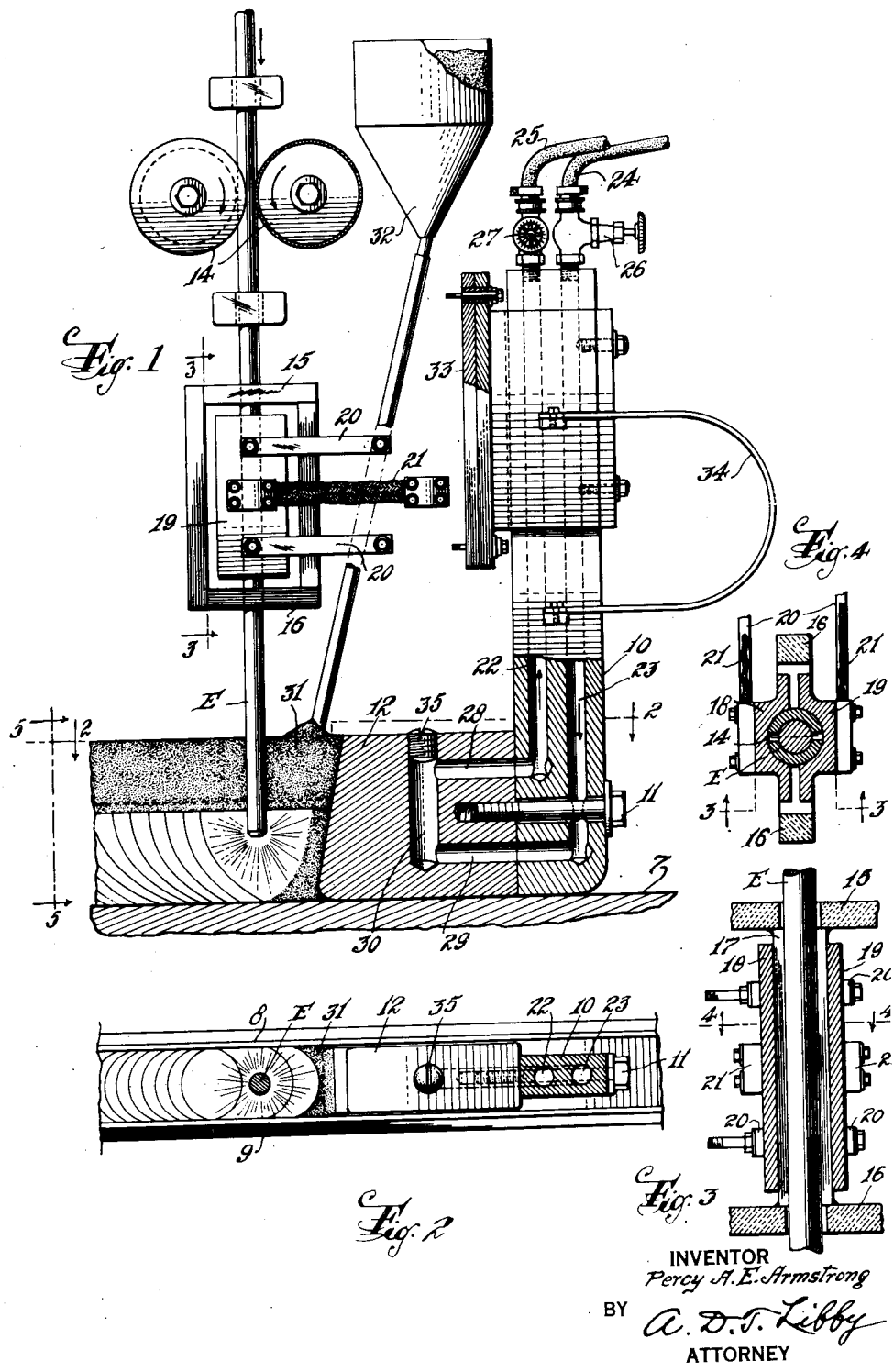
INVENTOR
Percy A. E. Armstrong
BY A. D. T. Libby
ATTORNEY

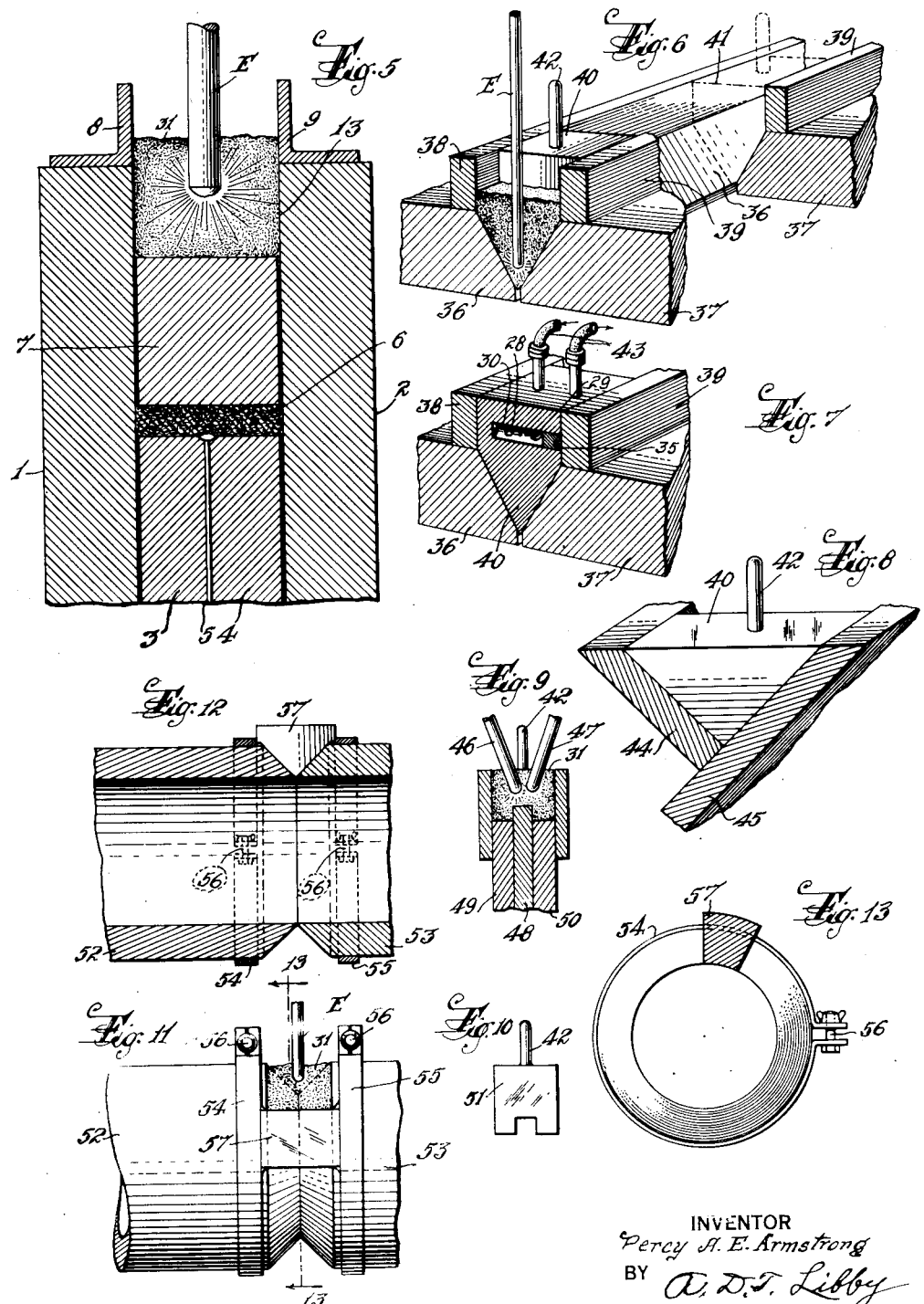

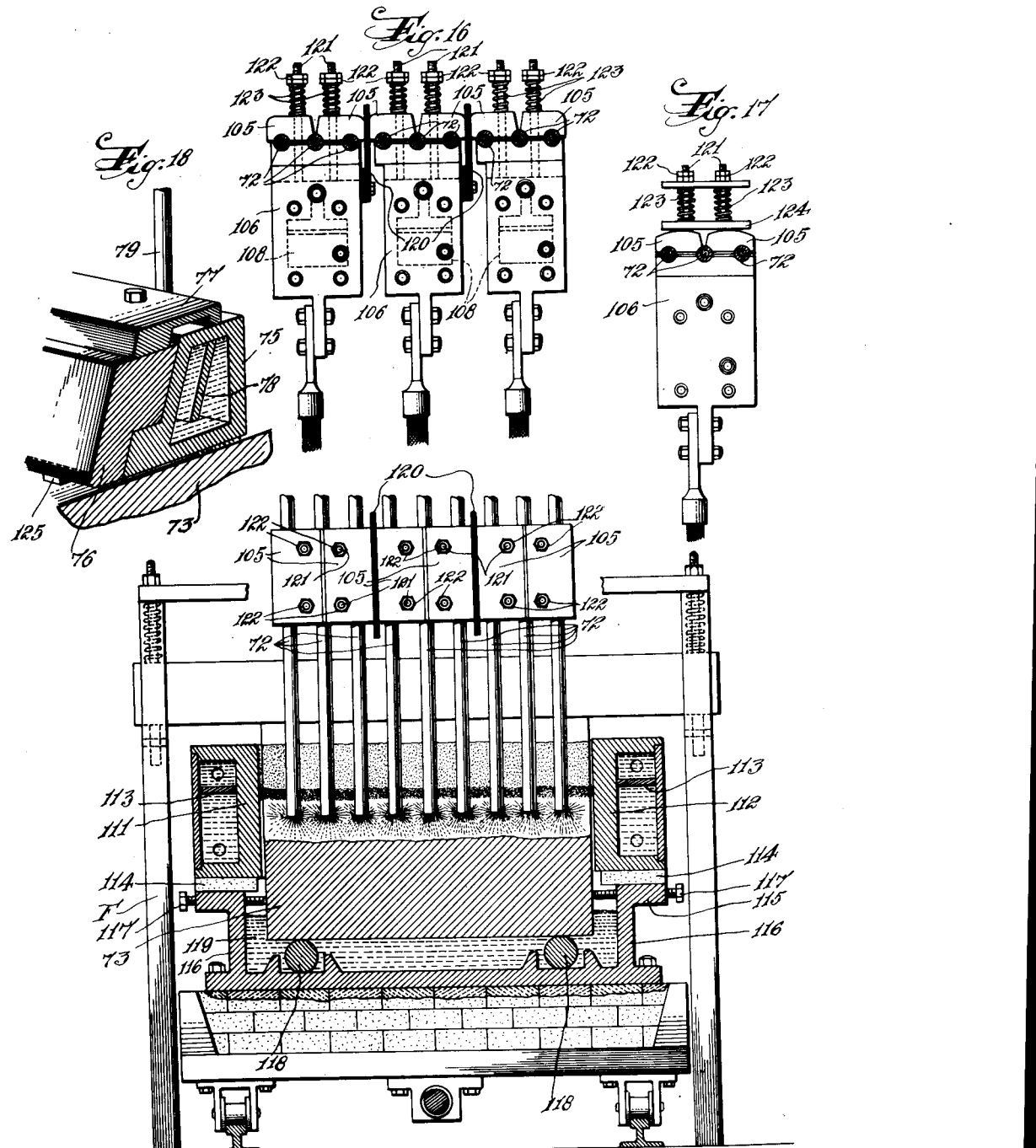

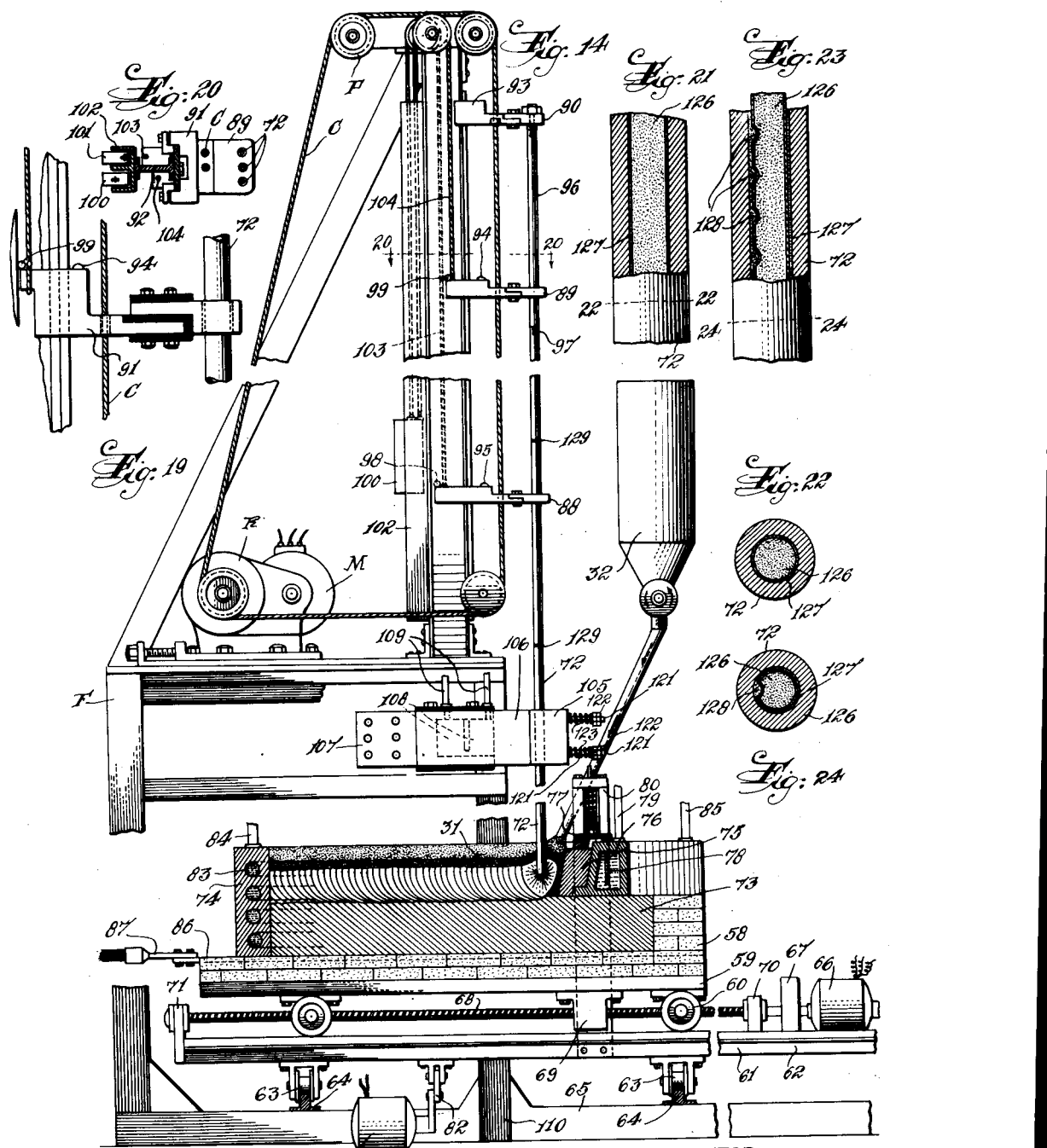

Patented May 13, 1941

2,241,572

UNITED STATES PATENT OFFICE 2,241,572

WORKING METALS BY THE ELECTRIC ARC

Percy A. E. Armstrong, Westport, Conn.

Application November 7, 1940, Serial No. 364,690

11 Claims. (Cl. 219—10)

This invention relates to a process of working metals by the electric arc, and the present application is a continuation in part of my application Serial No. 304,077, filed November 13, 1939.

The process is adaptable for "cladding" or applying metal from a suitable electrode to flat stock or slabs which may be subsequently rolled into thin sheets, or for deep-seam welding in which relatively deep grooves or channels separate the parts to be welded together. In either case the arc is maintained under a thick coating of suitable slagging material which surrounds the electrode or electrodes and covers the weld area.

There are many cases where this type of metal working by the electric arc is essential and predominantly better than the use of an electrode or electrodes covered with a flux or slag coating. In both cases, where the flat workpiece has considerable width, or where the workpieces form a groove or channel having a cross-section of considerable area, a large amount of metal has to be deposited by the electrode or electrodes, especially if the workpiece is to be covered, or the groove or channel is to be filled in one pass, as distinguished from the type of welding wherein several beads or layers are applied, one over the other. In the single-pass method, the large amount of molten metal produced at the arc will flow away from the weld area, and by this I mean the area over which the arc is to be maintained, and will cool at its outer extremities without making a fusion joint between the parts to be united.

After a long study of this problem and many experiments, I have discovered that this difficulty and trouble can be overcome by providing a dam in relatively close juxtaposition to the weld area, the dam to be simultaneously movable with the electrode, if the operation is that of an automatic welding process; or manually, if the type of welding calls for manual operation.

It is therefore the principal object of my invention to provide a process of what might be termed under-slag welding and cladding, in which the molten metal may be confined within a desired area so as to produce the maximum efficiency and strength in the weld, and to insure the edges of the deposited metal actually fusing with the metal to be welded.

Another object of my invention is to provide ways and means for applying or welding metals of any desired composition across the entire width of a workpiece or slab, so that the same may be covered with at least one layer of this additional metal in one pass or operation, such an operation being generally referred to as "cladding," after which the strip or slab may be rolled into sheets which will have a thin layer of this special metal applied to one surface thereof.

Other and ancillary objects will be discerned by one skilled in this art, from a study of the specification and annexed drawings, wherein.

Figure 1 illustrates, somewhat diagrammatically, ways and means of carrying my improved process into practical operation.

Figure 2 is a view on the line 2—2 of Figure 1.

Figure 3 is a view on the line 3—3 of Figure 1.

Figure 4 is a view on the line 4—4 of Figure 3.

Figure 5 is an enlarged view on the line 5—5 of Figure 1.

Figure 6 is a perspective view, part in elevation and part in section, of a modified form of construction.

Figure 7 is a perspective view, part in elevation and part in section, of a further modified form of construction.

Figure 8 is a perspective view, part in elevation and part in section, of a still further modified form of construction.

Figure 9 is a perspective view, part in elevation and part in section, of a further modified form of construction.

Figure 10 is an elevational view of the dam to be used in the construction shown in Figure 9.

Figure 11 shows a further modified application of my invention.

Figure 12 is a part-sectional and part-elevational view of the structure of Figure 11, with the parts turned ninety degrees.

Figure 13 is a view on the line 13—13 of Figure 11.

Figure 14 is a view having some of the features of Figure 1, but showing a modified construction of feeding the electrodes to the work, as well as a modified form of obtaining relative movement between the work and the electrodes.

Figure 15 is a transverse view partly in section and partly in elevation of a form, showing a plurality of electrodes in operative relation to the work, the method of feeding the electrodes, however, being similar to that shown in Figure 1.

Figure 16 is a view of one type of electrode shoe which serves to convey current to the electrodes.

Figure 17 is a view similar to one of the units shown in Figure 16, but a slightly modified construction of holder.

Figure 18 shows a dam construction similar to that shown in Figure 14, but with a slight modification thereof.

Figure 19 is an enlarged view of one of the electrode guide supports shown in Figure 14.

Figure 20 is a part-sectional and plan view on the line 20—20 of Figure 14.

Figure 21 illustrates one form of electrode which may be used.

Figure 22 is a section on the line 22—22 of Figure 21.

Figure 23 is a view of a modified form of electrode construction.

Figure 24 is a view on the line 24—24 of Figure 23.

Referring now to the details wherein like numbers refer to corresponding parts in the various views, Figures 1 to 5 inclusive show the application of my present invention to the welding of alloy steels for the purpose described in my Patent 1,997,538, issued April 9, 1935. The problem, which is a difficult one, as will be seen from a study of said patent, is to weld, to a low carbon steel, a facing portion of some special alloy, such as chromium and nickel, chromium and vanadium, chromium, tungsten and vanadium, or other special alloys. This welding is done by an arrangement such as disclosed in said patent and shown diagrammatically in Figure 5 of the drawings herein to illustrate the application of my present invention to the problem which has confronted me since the invention of said patent was made. It is to be understood that the welding electrode and workpieces are connected to a suitable source of current.

In Figure 5 of the present application, 1 and 2 are members of low carbon steel. Between them are positioned alloy plates 3 and 4 separated by some material 5 as disclosed in said patent, which will prevent the alloy plates from welding together, but in carrying out the process of said patent, the plate 3 becomes welded with plate 1, and the plate 4 to the plate 2. Directly above the plates 3 and 4 may be positioned some satisfactory material such as steel wool 6 which, if used, is tightly packed therein to allow for the expansion of the alloy plates, and to prevent any dust from the slag falling down between the alloy plates 3 and 4 and their backing plates 1 and 2. A spacer bar 7 is then positioned adjacent the material 6, leaving a space or channel above the member 7 for arc-welding the members 1 and 2 together and to member 7. This welding is facilitated by securely clamping together the members 1 and 2, with the parts just mentioned between them, by suitable means. The opposite edges 1 and 2 are similarly welded together and to another spacer bar 7, it being understood that Figure 5 shows only one edge of the assembly as indicated by the broken line at the bottom of the figure. After the edges have been welded the completed structure may be rolled, all as set forth in said patent.

The space around the electrode E is filled with some suitable slag material, preferably composed of open-hearth slag which has been finely divided by pulverizing to at least one hundred-degree mesh. Such slag does not have water of crystallization and is dead-burned, and therefore free from any large quantities of vapor, and consequently eliminates boiling tendencies in the parts adjacent the molten metal around the electrode E. Furthermore, such dry, crushed, open-hearth slag will not pack in the feeding tube where the slag is automatically fed to the channel. It may be mentioned in passing that if the slag is found to have too high a melting point, then a certain amount of fluorspar or the equivalent may be added. In addition, the slagging material may contain any desired metal or alloy for the purpose of melting this into the weld. If carbon or graphite electrodes are used, as shown in Figure 9, or any other slow-burning electrode, filler metal may be added to the slagging material so that this metal will be melted and deposited in the weld. The object of the thick slag covering is to keep air from the molten metal and to hold the heat on the weld area sufficiently long to anneal to a certain extent and improve the grain structure of the weld.

Positioned on the end of the tops of the members 1 and 2 are retaining members 8 and 9 which may be angle-irons tack-welded to the members 1 and 2 so as to hold the slag in position as it lies above the weld material, when it is laid down from the electrode E. For this type of work, which is adapted for large steel mill operation, I have found that the current should be about 3,000 amperes for each half-inch diameter of the electrode, and I prefer to use alternating current with a line voltage of 110 to 120 volts, the voltage across the arc to be somewhere around fifty volts.

From the foregoing it is seen that the application of my invention to this particular problem is perhaps out of the range of ordinary arc welding where the currents involved are from fifty to three hundred amperes, and the voltage across the arc is from twenty to forty volts, and it is thus seen that with a half-inch diameter metal electrode, and 3,000-ampere current, a large amount of metal is deposited in the weld area in a very short interval of time, and this hot metal tends to flow away longitudinally of the channel and prevents getting proper fusion between the parts.

To overcome this trouble, I have provided an apparatus as shown in Figure 1, in which an arm 10 has fastened thereto, by one or more studs 11, a dam 12 preferably of good conducting material such as copper. The dam 12 is positioned in the channel 13 relatively close to the arc or weld area. The electrode E, as shown in Figure 1, is fed automatically by the feed rollers 14, contact to the electrode E being made in any satisfactory manner as by the means shown in Figures 1, 3 and 4, in which support members 15 and 16 carry a split sleeve 17 of good conducting material such as copper, and around which are suitably clamped contact shoes 18 and 19 supported by arms 20. Current is conveyed to the shoes 18 and 19 by one or more flexible conductors 21. The arm 10, carrying the dam 12, has passages 22 and 23 therein to which are connected incoming and outgoing fluid-cooling pipes 24 and 25 controlled, respectively, by valves 26 and 27.

The dam 12 is provided with suitable passages 28 and 29 to cooperate with the passages 22 and 23, which passages are cross-connected by a bore 30 which may be plugged as by a screw 35, so that cooling fluid may be passed through the dam 12 to assist in carrying away the heat, whereby the dam will not get so hot as to become welded to the interior walls of the channel. The slag material 31 may be automatically fed from a container 32 to the channel as the welding progresses, it being understood that in the application shown in Figure 1 the arrangement is for an automatic process, the arm 10 advancing with the electrode; or if the electrode and arm are stationary, the work may be passed below them, but in either case the arc is covered with a thick coating of one inch, more or less, of slag material. In some cases the thickness of the coating may be six inches or more.

As shown in Figure 1, the arm 10 is carried on suitable support members 33 and a spring 34 is attached to the arm to take up any inequalities which may be present in the bottom of the channel, to correct the setting of the dam. If necessary, a similar spring may be used on the opposite side of the arm. In place of the type of arm shown, having holes drilled therethrough, two telescopic tubes could be used with suitable connections to the dam.

In the type of welding shown in Figure 6, the two pieces 36 and 37 are provided with a V-shaped groove or channel for the application of the welding material. Guide members or flashboards 38 and 39 are tack-welded to the members 36 and 37 to hold the weld metal as the slag rises during the welding operation. A somewhat different type of dam 40 is used, the shape of it being indicated by broken lines 41 in Figure 6. In this figure, the dam is adapted to be moved by a handle 42 carried by the dam. The handle 42 may be constructed so as to act as a rest for the operator's hand carrying the welding handle which supports the electrode E. In this case, the slag is applied to the channel before the welding operation is started, or it may be fed to the weld area, and the surplus picked up as the weld proceeds, as disclosed in Holslag Patent 2,105,079, issued January 11, 1938.

In Figure 7 the dam 40 is similar to that shown in Figure 6, except that it is provided with an interior hollow space to receive a cooling fluid through flexible pipe connections 43.

In Figure 8, I have shown an arrangement of parts in which the members 44 and 45 are arranged so that they act as flash-boards to retain a sufficient quantity of slag for the welding operation.

In Figure 9, I have indicated the use of two electrodes 46 and 47 of the non-depositing, non-burning or slow-burning type such as carbon. As the arc melts the extended end of the piece 48, the metal flows over and welds to the pieces 49 and 50. The dam 51 of this type of weld is illustrated in Figure 10.

In Figures 11, 12 and 13, I have shown the application of a dam to the welding of circular pieces, such as pipes 52 and 53. In this application the ends of the pipe are machined on a slant to form a V-shaped groove. Around the pipes 52 and 53 are positioned rings 54 and 55 which are clamped with a suitable tension by some means such as bolts 56. Attached to the rings and extending across the groove or channel between the pipe ends is a dam 57 having at least its inner end formed to the arc of the meeting edges of the pipe. The rings, with the dam 57, are positioned so as to hold the slag material in position, and as the welding operation is carried downward, the rings with the dam may be rotated about the pipe so that at least a greater portion of the weld may be completed by an arc protected by the slag material. If the joint is in vertical position, then one of the rings may be provided with a lip so as to retain sufficient slag material to complete the weld under the slag all the way around the periphery of the pipe.

To preheat the pipe ends and normalize them, I prefer to use what is known in the trade as the Smith-Dolan system as set forth in Patent 2,184,534, issued December 26, 1939, in which the pipe ends 52 and 53 are supplied with a suitable number of turns of large current-conducting wire which would be placed closely adjacent the rings 54 and 55. With this arrangement, alternating current is used and the pipe ends are heated by induction.

In Figure 14 I have shown a more direct and simpler arrangement of applying the desired metal or alloy to the workpiece which is later to be rolled out into thin sheets, than that shown in Figure 5. In Figure 14, a bed 58 of refractory bricks is carried on a base plate or bed 59 having a plurality of trucks or grooved wheels 60 running on rails 61. The rails 61 are supported on a bed plate 62 which in turn carries transversely positioned wheels or rollers 63 adapted to engage transverse rails 64 that are supported on I-beam base members 65. A motor 66, operating through a reversing and reduction gear 67, drives a worm shaft 68. A member 69 fastened to the bed plate 59 is threaded to receive the worm screw 68 which is supported by bearings 70 and 71, one or both of which may be of the thrust type so that as the motor 66 turns the worm screw 68, the bed plate 59 and parts supported thereon will be given a motion to conform to the position of a plurality of electrodes 72 which are carried by a suitable support-and-feed apparatus to be presently described.

The workpiece or slab 73, to which the metal from the electrode 72 is to be applied or welded, is positioned within the sides and one end member 74 of what might be termed the housing for the slab. By way of illustration, but not of limitation, a reasonable size ferrous-metal slab— which is to be clad with any metal such as chromium, manganese, nickel, tungsten, molybdenum, vanadium or other metals or alloys—may be of the order of five feet long to two and one-half feet wide, and about fifteen or sixteen inches thick, and the metal from the electrode to be applied thereto will be in the neighborhood of three inches thick, it being understood that a certain amount of the face of the slab will be melted by the arcing electrodes, the extent of this melted-in face surface depending on the relative speed of movement between the bed carrying the slab and the electrodes, and the amount of current passing through the arcs. Generally, such "melting-in" will be about one-fourth to one-half inch in thickness.

As heretofore described with respect to Figure 1, a dam 75, preferably made of good heat-conducting material such as copper, which extends clear across the width of the slab, is arranged in relatively close relation to the arcs which are located beneath a thick coating 31 of slagging material which is automatically fed from the container 32 by a plurality of tubes to evenly distribute the slag. Since the dam 75 holds the molten material in proper position, no end wall to the right of the dam need be provided, and the dam can travel on the slab and a support beyond the end of the slab, whereby the arc may be continued to the end or edge of the slab 73. It may be noted, in passing, that the arcs may be started by placing finely divided pieces of metal or steel wool on top of the slab or workpiece for the ends of the electrodes to first engage.

In Figure 14 the dam 75 has a facing 76 of fire-resisting material such as magnesite, the same being held to the dam 75 in any satisfactory manner as by a shoe 77. The magnesite face will withstand tremendous heat and thus protect the metal portion of the dam. Furthermore, the dam 75 is hollow and preferably provided with an interior deflector 78 so as to cause a cooling fluid to pass downwardly around the end of the deflecting plate and thereby cause the cooling fluid to come in contact with the walls of the dam. The exit pipe 79 is shown in the drawings.

The dam 75 is held in position by a support 80 which is carried by the bed plate 62, it being understood that these support members are positioned so as to allow the slab bed 59 to pass freely under the dam 75. The electrodes may be moved longitudinally and the bed kept stationary; also, the electrodes may be moved transversely relative to the bed, but I prefer to move the entire bed. The transverse motion is produced by a motor 81 connected to the bed plate 62 through a suitable crank-and-link mechanism 82. The purpose of this transverse motion will be later described in connection with Figure 15.

The end member 74 and the side members of the bed carrying the slab are provided with orifices 83 to allow cooling fluid to pass from the pipe 84 through these orifices or hollow portions and out the exit pipe 85. The ground or common return for the current passing through the arc and the slab 73, is provided by a suitable conducting plate 86 on which the slab 73 rests, connection to the plate 86 being made by way of a terminal 87. For the type of cladding shown in Figure 14, I prefer to use a three-phase alternating current source of power, with the neutral grounded to which the slab is connected as previously described.

In Figure 14, the framework F carries a motor M which is connected through a suitable speed reduction mechanism R. The mechanism R operates a series of pulleys P by means of cables C, there being a group of pulleys and a cable for each phase of current supply. The number of electrodes to be used for each phase is governed by the size of the electrode and this, in turn, by the amount of metal that is desired to be welded to the slab at a single pass or one longitudinal movement of the slab under the electrodes. If the metal to be laid down is applied in two passes, then the electrodes 72 will need to be only half as long, other conditions being the same, as in a case where all the metal is to be applied in one pass. For the size slab heretofore stated and for a single pass, the electrodes will be of considerable length, and consequently one or more guide supports are necessary.

As shown in Figure 14, two extra guide supports 88 and 89 are provided in addition to the drive support 90. The supports 88 and 89 are substantially alike and are shown more in detail in Figures 19 and 20, where, in Figure 20, three electrodes 72, connected to one phase of the power circuit, are guided in the members 88 and 89 which are insulated from and fastened to respective members 91 which, in turn, are carried by a channel member 92 comprising part of the framework. The cable C passes through clearance holes in the members 91 of the supports 88 and 89, but is fastened to the corresponding member 93 of the drive support 90 which is fastened in any satisfactory manner to the ends of the electrodes 72. As the motor M moves the cable C, which is anchored to the member 93 of the drive support 90, the electrodes are carried downwardly to feed the arc. When the member 93 engages the member 91 of the support 89 at the point 94, the support 89 is carried downwardly along with the electrodes until it in turn engages the member 88 at the point 95, and then this support is carried along with the electrodes.

The upper portions 96 of the electrodes may be dummies; that is to say, they are not utilized in the arc and may be of any desired material, but are detachably fastened at 97 in any satisfactory manner as by screw threads to the welding electrodes. At the end of the downward movement of the electrodes, the reversing mechanism will reverse the movement of the cable C to carry the supports 88 and 89, as well as 90, back to their initial starting position where new electrodes are inserted in position. A stop pin 98 carried by the frame member stops the support 88 at its proper location, while a stop pin 99 locates the support member 89 in its initial starting position. These supports 88 and 89 are carried back to their initial starting position by means of weights 100 and 101 which are positioned in a channel member 102 comprising part of the frame F and connected to their respective supports 88 and 89 by cables 103 and 104.

Connection is made to the electrodes 72 by means of a shoe 105 resiliently carried on studs supported by a contact bracket 106 supported at least in part by a member 110 which is carried by the frame F, but insulated therefrom. Current is conveyed to the bracket 106 through the medium of a terminal 107. Since the current through the bracket 106 and shoe 105 is large and considerable heat is generated at the arc and runs up the electrodes, it is preferable to cool the member 106, and cooling chambers 108 are preferably provided therein, the pipes for conveying cooling fluid thereto being indicated at 109.

In Figure 15 I have shown a view at right angles to that of Figure 14, which may be illustrative in part thereof insofar as the location of the electrodes is concerned. In this figure the side walls 111 and 112 are indicated as being made of copper, with liquid-cooling chambers therein, the chambers being provided with deflectors 113 to insure better circulation of the cooling fluid. The chambered side walls are supported on insulating slabs 114 of brick of high-heat-resisting material, such as magnesite, and these in turn rest on the flange 115 of a cast iron box 116. The reason for these bricks or separation strips 114 is to prevent the water-cooled copper side walls 112 from cooling off the cast iron box 116, through the side walls of which pass adjusting studs 117 for properly positioning the slab 73 which rests on two copper bars 118. Preferably, before the slab 73 is positioned in its bed, it is preheated, and if so, this will maintain the lead 119 in molten condition, the lead being poured into the iron box 116 at a depth to embrace the lower portion of the slab 73. This will maintain a good electrical ground contact with the power supply. In Figure 15 I have shown the three electrodes of each phase separated from the other phases by insulators 120.

Figure 16 shows more in detail one form of electrode shoe in which the studs 121 carry nuts 122 which compress the springs 123 to force the shoes 105 into engagement with the electrodes 72.

In Figure 17, instead of the springs acting directly on the shoes 105, they act on a common plate 124 which engages both the shoes 105.

If desired, the dam 75 may be provided with relatively thin shoes 125 for it to travel across the slab 73. If there is any tendency for the slag to work under the dam around the shoes 125 as positioned, they may be extended longitudinally of the dam or crosswise of the slab 73, the idea being to reduce the frictional area of contact of the dam on the slab. In place of the shoes 125, low button casters may be used.

While, in Figure 15, I have shown the electrodes as being all of the same size, they may be of different diameters and they may differ in material, one from the other, but where an alloy electrode is used, one form may be similar to that shown in Figure 21, in which the alloy core 126 is either cast or briquetted in a thin, low-carbon steel tube 127 which may or may not be of the seamless type, as it is not necessary that a seamless tube be used. This tube, in turn, is fixed in position within the electrode 72 as by means of a cement, like silicate of soda; or the walls of the tube 127 may be indented at 128 to prevent the alloy core from slipping out of the tube. The core does not have to be made this way, but it is a good way of making up the complete electrode when a solid electrode is not desired.

In order that the outside electrodes, referring to Figure 15, will arc on the extreme edges of the slab 73, it is desirable in some cases to give a slight, transverse motion to the bed carrying the slab, and this is done, as reference has been made, by the electric motor 81 and its connections to the sub-base structure. This transverse motion also acts to shift the arcs in their position so as to better insure a common and more uniform puddle of molten metal. Only two or three inches of movement are required for this purpose.

If it is desired to use long electrodes, say of the order of forty to fifty feet, shorter sections may be welded together at 129 to make up this extra length electrode which might be required for a one-pass operation. The joining of sections will be necessary if a cold-drawn seamless tube is used as this is usually only made up in lengths of fifteen to twenty feet.

As has been described with respect to Figure 1, as the molten metal is deposited on the surface of the slab, it cannot flow away because of the confining side walls around the edges of the slab and the dam which is closely positioned adjacent the arcs. As the slab is moved under the dam and electrodes, the deposited metal will solidify sufficiently rapidly to prevent any flow-away of the molten metal on one side, and the dam will confine the molten metal around the immediate area of the ends of the electrodes, etc. In this operation, the deposit of metal should be at a speed so that the common pool does not become too large. If the pool is too large, there may be a tendency for segregation of the alloy components. The shrinkage of various metals at the temperatures in the vicinity of the arc will be approximately one-fourth inch per lineal foot, and shrinkage causes piping and cracking. Consequently, it is necessary to keep the pool to the smallest dimension consistent with the homogenous weld which is thoroughly fused with the face of the slab or the workpiece, or pieces, and as heretofore pointed out, the electrodes operate under a heavy blanket of slag which protects the molten metal across the entire width of the slab and retains the heat to a very large degree in the molten pool, allowing the same to cool sufficiently slowly so that cracking of the weld does not take place. It may be noted in passing that the slag may or may not contain some suitable reducing agent such as silicon, aluminum or magnesium. While carbon is generally undesirable, it may be used. While I have indicated a three-phase current because of the large power required, other poly-phase, single-phase or direct current may be used.

It will be quite apparent that the details of construction of the framework, the electrode shoes, contact members, arrangement and types of electrodes used, as well as other details may be varied over a wide range without departing from the spirit of my invention or the scope of the appended claims.

What I claim is:

1. The process of deep-seam arc-welding pieces of metal together which consists in covering the weld area in the seam with a thick blanket of slagging material, providing a dam in the seam relatively close to the weld area, striking and maintaining an arc on the weld area with a metallic electrode extending through the slagging material and causing relative movement between the dam and the walls of the seam according to the location of the electrode therein.

2. The process of deep-seam channel-welding pieces of metal together which consists in covering the weld area in the channel with a thick blanket of slagging material, providing a dam of good heat-conducting material in the channel relatively close to the weld area, striking and maintaining an arc on the weld area with a metallic electrode extending through the slagging material and causing relative movement between the dam and the channel according to the location of the electrode, while at the same time cooling the dam for the purpose described.

3. The process of arc-welding metal pieces together which consists in bringing the pieces together to form a channel-like space to be filled with weld metal, locating a movable dam in the channel, filling the channel-like space ahead of the dam in the electrode space with a suitable slagging material, positioning the end of at least one electrode within the slag adjacent the dam and striking an arc, and completing a weld area and then effecting continuous and simultaneous relative movement between the electrode and dam considered as a unit, and the pieces.

4. The process of welding metal pieces together which consists in operating an arc between at least one electrode and the weld area of the pieces to be welded together, providing on one side only of said pieces a dam shaped to fit the space formation between the pieces and closely adjacent the weld area, moving the dam and electrode in the same relative relation along the seam to be welded, automatically keeping the arc and the space between it and the dam as the latter is moved forward, completely covered by a thick covering of slagging material.

5. The process of applying metal to relatively closely spaced workpieces forming a seam therebetween by means of an arc from a metallic electrode to the work pieces forming the other electrode of the arc, which consists in temporarily fastening a side-retaining member to each workpiece closely along the seam and in such manner as to provide a space between the side-retaining members, positioning closely adjacent the arc a dam in the spaces between the workpieces and the side-retaining members, the dam being of such shape that it substantially completely fills the spaces between the side-retaining members and the workpieces, keeping the space between the dam and the arc and the space around the arc covered by a thick covering of slagging material, and then causing relative movement between the metallic electrode and the workpieces while at the same time keeping the dam and electrode in the same relative relation along the workpieces as the metallic electrode is used up in the arc.

6. The process of applying metal to a workpiece by means of an arc from a metallic electrode to the workpiece forming the other electrode of the arc, which consists in providing two side barriers in fixed relation to the workpiece, positioning closely adjacent the arc in starting position a dam on the workpiece and substantially spanning the space between the side barriers, starting an arc and keeping the space between the dam and the arc, and the space around the arc covered by a thick covering of slagging material, and then causing relative movement between the metallic electrode and the workpiece, while at the same time keeping the dam and electrode in the same relative relation along the workpiece as the metallic electrode is used up in the arc.

7. The process of applying metal to a workpiece by means of arcs from a plurality of metallic electrodes to the workpiece forming a common electrode for all the arcs, which consists in providing two side-barriers and at least one end barrier for the workpiece, arranging the said plurality of electrodes in a group transversely across the workpiece so the arcs will make a common puddle of molten metal, positioning closely adjacent the advancing side of the puddle a dam on the workpiece and spanning the distance between the side-barriers, starting an arc at the end barrier of the workpiece and keeping the space between the dam and the arcs and the space around the arcs and puddle covered by a thick covering of slagging material and then causing relative movement between the said plurality of electrodes as a group and the workpiece, while at the same time keeping the dam and group of electrodes in the same relative relation along the workpiece to prevent the flow-away of the molten metal in a direction in advance of the electrodes as the metallic electrodes of the group are used up in the arc.

8. The process of cladding a workpiece with a metal or metals by means of an electric arc using the said metal or metals as electrodes to be welded onto the workpiece, which consists in arranging a plurality of the electrodes to be consumed in a manner so their arcs will form a common puddle, covering the weld area over and around the puddle with a thick covering of slagging material, providing a dam close to the puddle and close to the electrodes at the advancing sides of the arcs, the dam being positioned at substantially 90 degrees to the axial line of the deposited metal and extending substantially clear across the workpiece, striking and simultaneously maintaining an arc from each of the electrodes across the weld area of the workpiece under the surface of the slagging material and causing relative movement between the dam and the workpiece while maintaining the same relative position of the electrodes and dam.

9. The process of applying metal to a workpiece with an electric arc which consists in arranging a plurality of metallic electrodes transversely across the workpiece, covering the area around the ends of the electrodes with a thick covering of suitable slagging material, providing a dam structure for contacting with and confining the molten material around the immediate area of the ends of the electrodes, the dam structure being progressively and simultaneously movable with the electrodes along the workpiece, striking and maintaining simultaneous arcs from the electrodes to the workpiece and causing relative movement between the workpiece and the electrodes while retaining the same relative position between the electrodes and the dam structure.

10. The process of applying to a workpiece special metal to be converted with the workpiece into a structure having a veneer face of the special metal, which consists in providing side-retaining members and positioning the workpiece between them and below the top edges thereof and in fixed relation thereto, then arranging at least one electrode within arc striking distance of the workpiece, covering at least the arc area around the electrode with a thick covering of suitable slagging material, providing a dam extending substantially across the entire workpiece between the retaining member and close to the arc area to hold the metal when melted close to the arc, striking and maintaining an arc on the workpiece and causing relative longitudinal movement between the workpiece and dam while maintaining the relative position of the dam and electrode, with the dam in advance of the electrode, and at the same time cooling the dam.

11. The process of building up or cladding special metal onto a workpiece with an electric arc, the workpiece to be subsequently converted into a structure, which consists in providing a support for the workpiece and also providing side retaining members fixedly carried by the support with means for cooling said side-retaining members, covering at least the arc area with a thick covering of slagging material, providing a dam extending substantially the full distance between said side-retaining members and close to the arc area to hold the molten metal close to the arc, striking and maintaining an arc, with a voltage and current larger than necessary for normal welding, on the workpiece with at least one metallic electrode having the desired cladding qualities and extending through the slagging material and causing relative movement between the workpiece and the dam, while maintaining the same relative position between the dam and electrode, with the dam in advance of the electrode, and at the same time cooling the dam.

PERCY A. E. ARMSTRONG.